United States Patent
Cruz Moreno et al.

(10) Patent No.: US 8,407,612 B2
(45) Date of Patent: Mar. 26, 2013

(54) PINNING OF TABS IN TAB GROUPS

(75) Inventors: Radames Saul Cruz Moreno, Kirkland, WA (US); James E. Bartlett, Woodinville, WA (US); Adrian Michael Collier, Seattle, WA (US); Pradyumna Siddhartha, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 229 days.

(21) Appl. No.: 12/832,783

(22) Filed: Jul. 8, 2010

(65) Prior Publication Data

US 2011/0271224 A1 Nov. 3, 2011

Related U.S. Application Data

(60) Provisional application No. 61/330,222, filed on Apr. 30, 2010.

(51) Int. Cl.
*G06F 3/048* (2006.01)

(52) U.S. Cl. ......... 715/766; 715/777; 715/802; 715/804

(58) Field of Classification Search .................. 715/767, 715/777, 802, 804
See application file for complete search history.

(56) References Cited

U.S. PATENT DOCUMENTS

| | | | |
|---|---|---|---|
| 5,530,796 A | 6/1996 | Wang | |
| 5,668,964 A | 9/1997 | Helsel et al. | |
| 6,404,443 B1 | 6/2002 | Westerman | |
| 6,727,919 B1 | 4/2004 | Reder et al. | |
| 6,741,268 B1 | 5/2004 | Hayakawa | |
| 7,111,243 B1 | 9/2006 | Ballard et al. | |
| 7,124,373 B1 | 10/2006 | Patil | |
| 7,197,715 B1 | 3/2007 | Valeria | |
| 7,263,663 B2 | 8/2007 | Ballard et al. | |
| 7,412,660 B2 | 8/2008 | Donalson | |
| 7,673,249 B2 | 3/2010 | Awada et al. | |
| 7,739,620 B1 | 6/2010 | Kong et al. | |
| 7,921,372 B2 | 4/2011 | Suave | |
| 2005/0015730 A1 | 1/2005 | Gunturi et al. | |
| 2005/0172237 A1 | 8/2005 | Cragun et al. | |
| 2005/0210408 A1 | 9/2005 | Baranda | |
| 2006/0230356 A1 | 10/2006 | Sauve | |
| 2006/0271858 A1* | 11/2006 | Yolleck et al. | 715/738 |
| 2007/0028180 A1 | 2/2007 | Barbee et al. | |
| 2007/0067733 A1 | 3/2007 | Moore et al. | |
| 2007/0186176 A1 | 8/2007 | Godley | |
| 2008/0141161 A1 | 6/2008 | Raven et al. | |

(Continued)

FOREIGN PATENT DOCUMENTS

KR 10-0844070 7/2008

OTHER PUBLICATIONS

Windows 7 Bible, published in 2009.*

(Continued)

*Primary Examiner* — Alvin Tan
*Assistant Examiner* — Rinna Yi
(74) *Attorney, Agent, or Firm* — Workman Nydegger

(57) ABSTRACT

A multi-document application that includes a multi-document interface that includes a view area that displays one document at a time and includes a tab group element that displays tabs, each tab having a control that permits a corresponding document to be visualized in the view area. A user may then designate that one or more of the tabs are to be pinned to thereby have the multi-document application assign a pinned status to the tab. The pinned status may be persisted such that when the multi-document application is closed and reloaded, the pinned status remains. Further, when a tab receives a pinned status, the tab does not display less information regarding the corresponding document as compared to before the tab was pinned.

19 Claims, 11 Drawing Sheets

U.S. PATENT DOCUMENTS

| | | |
|---|---|---|
| 2008/0235608 A1 | 9/2008 | Prabhu |
| 2009/0006981 A1 | 1/2009 | Pagan |
| 2009/0327947 A1 | 12/2009 | Schreiner et al. |
| 2010/0257486 A1 | 10/2010 | Smith |
| 2010/0274851 A1 | 10/2010 | Abernethy |
| 2011/0271217 A1 | 11/2011 | Cruz Moreno |
| 2011/0271223 A1 | 11/2011 | Cruz Moreno |
| 2011/0314407 A1 | 12/2011 | Cruz Moreno |

OTHER PUBLICATIONS

Better tab management with Pin Tab for Firefox http://www.demogeek.com/2009/11/04/better-tab-management-with-pin-tab-for-firefox/.*
Pin Tab Offers Chrome-Like Pinned Tabs in Firefox http://lifehacker.com/5396929/pin-tab-offers-chrome+like-pinned-tabs-in-firefox.*
Pin Tabs in Firefox http://www.ghacks.net/2009/11/04/pin-tabs-in-firefox/.*
Too Many Tabs? Firefox Add-ons to manage a TAB JAM published Feb. 1, 2008 http://www.makeuseof.com/tag/too-many-tabs-firefox-add-ons-to-manage-a-tab-jam/.*
Visual Studio 2010 and .NET Framework 4 IDE Enhancements—Part2—Published Date: Dec. 31, 2009 http://dotnetslackers.com/articles/net/Visual-Studio-2010-and-NET-Framework-4-IDE-Enhancements-Part2.aspx (6 pages).
Visual Studio Tips and Tricks—Published Date: Apr. 14, 2010 http://blogs.msdn.com/zainnab/archive/2010/04/14/track-changes-in-the-editor-vstipedit0048.aspx (8 pages).
Create Great-Looking GUIs with NetBeans IDE 5.5—Published Date: Nov. 2006 http://java.sun.com/developer/technicalArticles/tools/nb_guibuilder/ (9 pages).
Google Chrome—GUI Design Insights!—Retrieved Date: Apr. 17, 2010 http://www.internetbrowserchrome.com/google-chrome-gui-design-insights/ (4 pages).
Add-ons for Firefox—Published Date: Apr. 4, 2010 https://addons.mozilla.org/en-US/firefox/addon/5627 (6 pages).
Tab Kit 0.5.8—Published Date: Aug. 2, 2009 https://addons.mozilla.org/en-US/firefox/addon/5447 (6 pages).
Using Tabbed Browsing—Retrieved Date: Apr. 29, 2010 http://caminobrowser.org/documentation/tabs/ (4 pages).
IE8 Tab Grouping—Retrieved Date: Apr. 29, 2010 http://www.timestampgenerator.com/news/1002/ie8-tab-grouping.html (7 pages).
Talk:Firefox:3.0 Tabbed Browsing—Published Date: Jul. 20, 2009 https://wiki.mozilla.org/Talk:Firefox:3.0_Tabbed_Browsing (11 pages).
IE8 Tab Grouping—Published Date: Oct. 2, 2008 http://blogs.msdn.com/ie/archive/2008/09/30/ie8-tab-grouping.aspx (17 pages).
Enhance Feature of Mozilla Firefox—Tab Grouping—Published Date: Aug. 3, 2007 http://web.uvic.ca/~chunchiu/seng422/seng422a3.pdf (16 pages).
Tabs Studio 1.9.0—Published Date: Mar. 5, 2010 http://www.downloadroute.com/Tabs-Studio-Sergey-Vlasov.html (1 page).
Firefox/Feature Brainstorming:Tabs, Sidebar, Windows—Published Date: Feb. 3, 2010 https://wiki.mozilla.org/Firefox/Feature_Brainstorming:Tabs,_Sidebar,_Windows#Tab_Groups.2FStacks (30 pages).
Author Unknown, "Camino, Mozilla Power, Mac Style", Oct. 16, 2008 (4 pages).
Author Unknown, "Designior for Mozilla" Aug. 8, 2007, (6 pages).
U.S. Appl. No. 12/832,692, May 17, 2012, Office Action.
Window 7 Bible, 2009, Wiley Publishing, Inc., Section 1.4—Internet Explorer 8.
The Visual Studio Blog, Jun. 9, 2010.
Comments by BoffinbraiN in a discussion on "Domain Specific UserChrome.css and UserContent.css?" from forum.userstyles.org, Jun. 2008.
"Change File and Shortcut Icon in Windows XP" from ofzenandcomputing.com, Nov. 22, 2006.
U.S. Appl. No. 12/819,019, Apr. 5, 2012, Office Action.
Notice of Allowance dated Oct. 12, 2012 cited in U.S. Appl. No. 12/819,019.
"Changing Firefox Tab Cycle Order," Published Aug. 5, 2009 http://superuser.com/questions/18609/changing-firefox-tab-cycle-order.
"Excel Sort Sheets Alphabetically Software for Windows 7", Released Aug. 18, 2009, http://www.windows7download.com/win7-excel-sort-sheets-alphabetically-software/djwupoax.html.
Organize your Firefox Tabs with Kit, published Mar. 12, 2008 http://downloadsquad.switched.com/2008/03/12/organize-your-firefox-tabs-with-tab-kt/.
Tab Mix Plus User Manual, published Nov. 26, 2009 http://web.archive.org/web/20091126023758/http://tmp.garyr.net/help/.
Tab Utilities Improve Tabe Management in Firefox, published Jan. 21, 2010 http://web.archive.org/web/20100121083528/http://www.ghacks.net/2010/01/18/tab-utilities-improve-tab-management-in-firefox/.
Office Action dated Oct. 2, 2012 cited in U.S. Appl. No. 12/832,692.
Tab Groups, published Dec. 17, 2008, http://www.ie-vista.comtabs_groups.html.
Customize Tab Behavior in Firefox with Tab Kit, published Aug. 5, 2009 http://howtogeek.com/howto/2802customize-tab-behavior-in-firefox-with-tab-kit/.
Office Action dated Aug. 29, 2012 cited in U.S. Appl. No. 12/832,789.
Supercharge Your Firefox Browsing With Icons (published on Jul. 26, 2009) http://www.40tech.com/2009/07/26/supercharge-your-firefox-browsing-with-icons/.
eDAN Manual (published on Nov. 2007).
Office Action dated Nov. 15, 2012 cited in U.S. Appl. No. 12/832,789.

* cited by examiner

PINNING OF TABS IN TAB GROUPS

CROSS-REFERENCE TO RELATED APPLICATIONS

This patent application claims the benefit under 35 U.S.C. 119 of U.S. provisional patent application Ser. No. 61/330,222 filed Apr. 30, 2010, and entitled "Pinning of Tabs in Tab Groups".

BACKGROUND

Multi-document applications are applications in which multiple documents may be opened at the same time, with one of the documents being active and the other documents being inactive. When a document is active, the document may be viewed in the main viewing area of the application. If the application enables editing of the document, the active document may also be edited. When a document is inactive, on the other hand, the document is not viewed in the main viewing area of the application. Instead, the inactive document is represented by a tab. In order to deactivate the current document, and activate another document, the tab corresponding to the particular document is selected. As documents are opened, new tabs are created. Often, the tabs are presented in a particular order.

As an example, web browsers can have multiple open multiple documents in the form of web pages. Each web page has a corresponding tab along the upper portion of the web browser interface. To switch from one open web page to another, the user selects the tab associated with the web page the user would like to see. The web browser responds to the selection by displaying the selected web page in the main viewing area of the web browser. As another example, some document editing programs, such as Visual Studio, use tabs, which may be selected to control which document is viewable and editable in the main viewing area of the document editing program.

BRIEF SUMMARY

At least one embodiment described herein relates to a multi-document application that includes a multi-document interface. The multi-document interface includes a view area that is configured to display one document at a time, even if multiple documents are opened in the multi-document application. The multi-document interface also includes a tab group element that displays tabs, each tab having a control that permits a corresponding document to be visualized in the view area.

For at least some documents, when there are too many tabs to be displayed simultaneously in the tab group element, the multi-document interface displays a subset of the tabs in the tab group element along with a navigation control for navigating through the tabs to change which subset is displayed in the tab group element. A user may then designate that one or more of the tabs are to be pinned to thereby have the multi-document application assign a pinned status to the tab. The pinned status gives the selected tab higher protection against being hidden when there are more tabs in the tab group element than are capable of being simultaneously displayed in the tab group element.

In one or more embodiments, the pinned status is persisted such that when the multi-document application is closed and reloaded, the pinned status remains. In one or more embodiments, when a tab receives a pinned status, the tab does not display less information regarding the corresponding document as compared to before the tab was pinned.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a multi-document application is described that includes a multi-document interface that includes a view area that displays one document at a time and includes a tab group element that displays tabs, each tab having a control that permits a corresponding document to be visualized in the view area. A user may then designate that one or more of the tabs are to be pinned to thereby have the multi-document application assign a pinned status to the tab. The pinned status may be persisted such that when the multi-document application is closed and reloaded, the pinned status remains. Further, when a tab receives a pinned status, the tab does not display less information regarding the corresponding document as compared to before the tab was pinned. First, some introductory discussion regarding computing systems will be described with respect to FIG. 1. Then, embodiments of the multi-document application will be described with respect to FIGS. 2 through 12.

Figure 1:
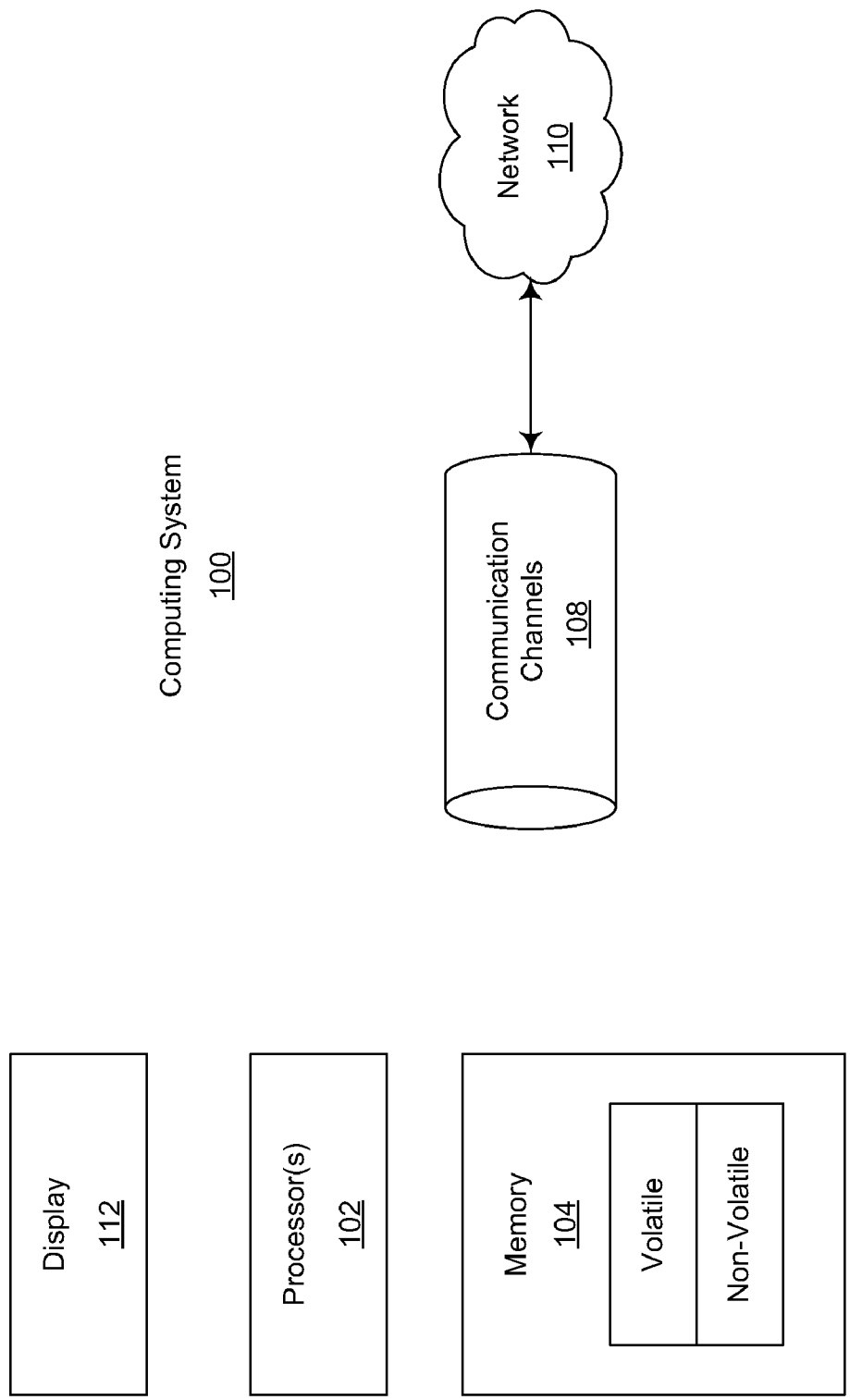
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. The computing system 100 also may include a display 112 that may be used to provide various concrete user interfaces, such as those described herein. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
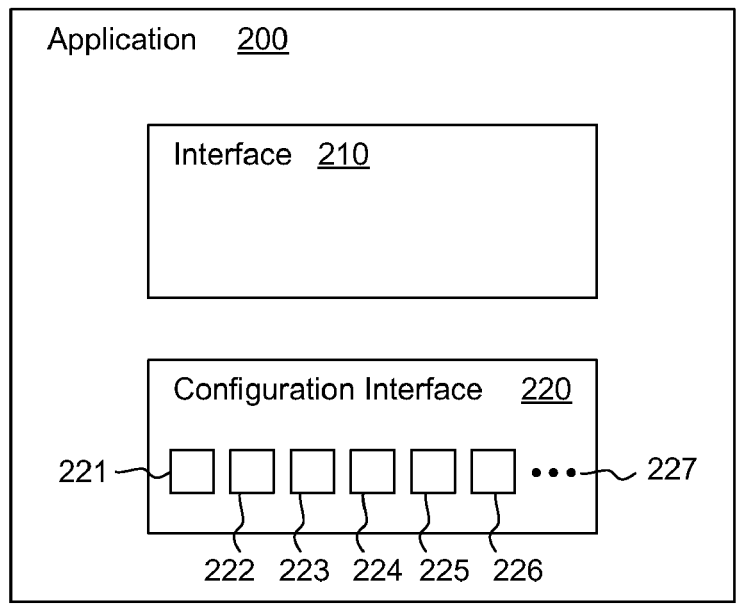
FIG. 2 abstractly illustrates a multi-document application with a multi-document interface.

FIG. 2 abstractly illustrates a multi-document application 200. A computer program product that may be comprised of one or more computer-readable media having thereon computer-executable instructions that may represent the multi-document application 200. The computer-executable instructions, when executed, implement a multi-document interface on the display (such as display 112 of FIG. 1). Accordingly, the multi-document application 200 is illustrated as including a multi-document interface 210. The multi-document interface 210 need not be the only interface that is provided by the multi-document application 200. Furthermore, FIG. 2 is just an abstract representation.

The multi-document application also includes a configuration interface 220 that permits a user to designate customization settings for the multi-document interface 210. In this abstract representation, there are six customization settings 221 through 226 that are configured by a user, but the ellipses 227 represent that there may be more or less than six of such customization settings set by the user. Examples of customization settings of the multi-document interface that may be set by a user are described below. However, the principles described herein are not limited to the configuration settings described herein.

Figure 3:
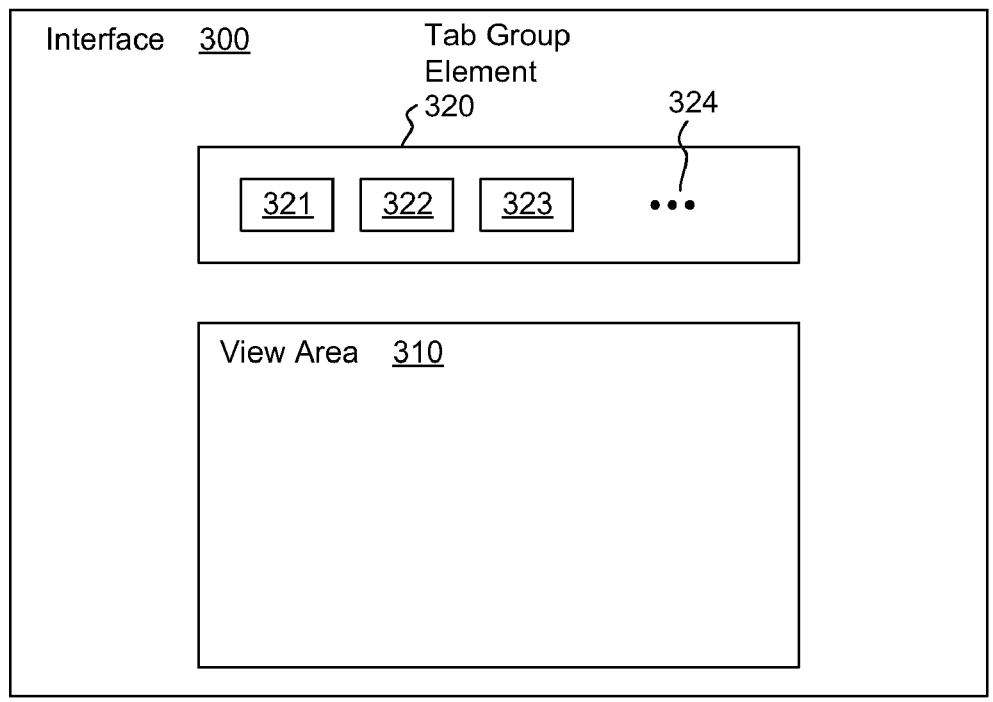
FIG. 3 abstractly illustrates a multi-document interface with a view area and a tab group element.

FIG. 3 abstractly illustrates a multi-document interface 300 that represents an example of the multi-document interface 210 of FIG. 2. The multi-document interface 300 includes a view area 310 and a tab group element 320. More concrete examples of such a multi-document interface will be described with respect to subsequent figures. The view area 310 is configured to display one document at a time, even if multiple documents are opened in the multi-document application. The tab group element 320 displays one or more tabs 321 through 323. Each tab comprising a control that permits a corresponding document to be visualized in the view area. For instance, if tab 321 is selected, one particular document is visualized in the display area 310. If tab 322 is selected, another particular document may be visualized in the display area 310. If tab 323 is selected, yet another particular document is visualized in the display area, and so forth.

The ellipses 324 represent that there may be any number of tabs in the tab group element 320, whether more than three or less than three. While the tab group element 320 is illustrated as being above the view area 310 in FIG. 3, FIG. 3 is just an abstract representation of the multi-document interface. The principles described herein are not limited to the actual position of the tab group element with respect to the view area. The tab group element 320 may be above, below, to the left, to the right, or have any other positioning with respect to the view area 310. In some embodiments described below, even the position of the tab group element 320 may be customized by the user.

The principles described herein are not limited to the types of documents that are displayed in the view area 310. The documents may be editable in the view area 310, or not editable in the view area 310. The documents may be any visualization of data. Examples include graphics editors, word documents, spreadsheets, flow diagrams, images, video, or any other visualization of data. The documents need not be of any particular file type, and different file types may be viewable within the view area 310 by selecting the appropriate tab.

For some, and potentially all of the documents that are opened by the multi-document application, when a new document is opened, the multi-document interface adds a new tab to the tab group element. In one or more embodiments, when there is not room for the new tab to be viewed in the tab group element, the multi-document interface hides at least one tab to make room in the tab group element for the new tab. In that case, the tab group element displays a tab corresponding to each of only a subset of the documents that are opened in the multi-application application. Furthermore, the multi-document interface provides a navigation control for navigating through the tabs to change which subset of tabs is displayed in the tab group element.

Figure 4:
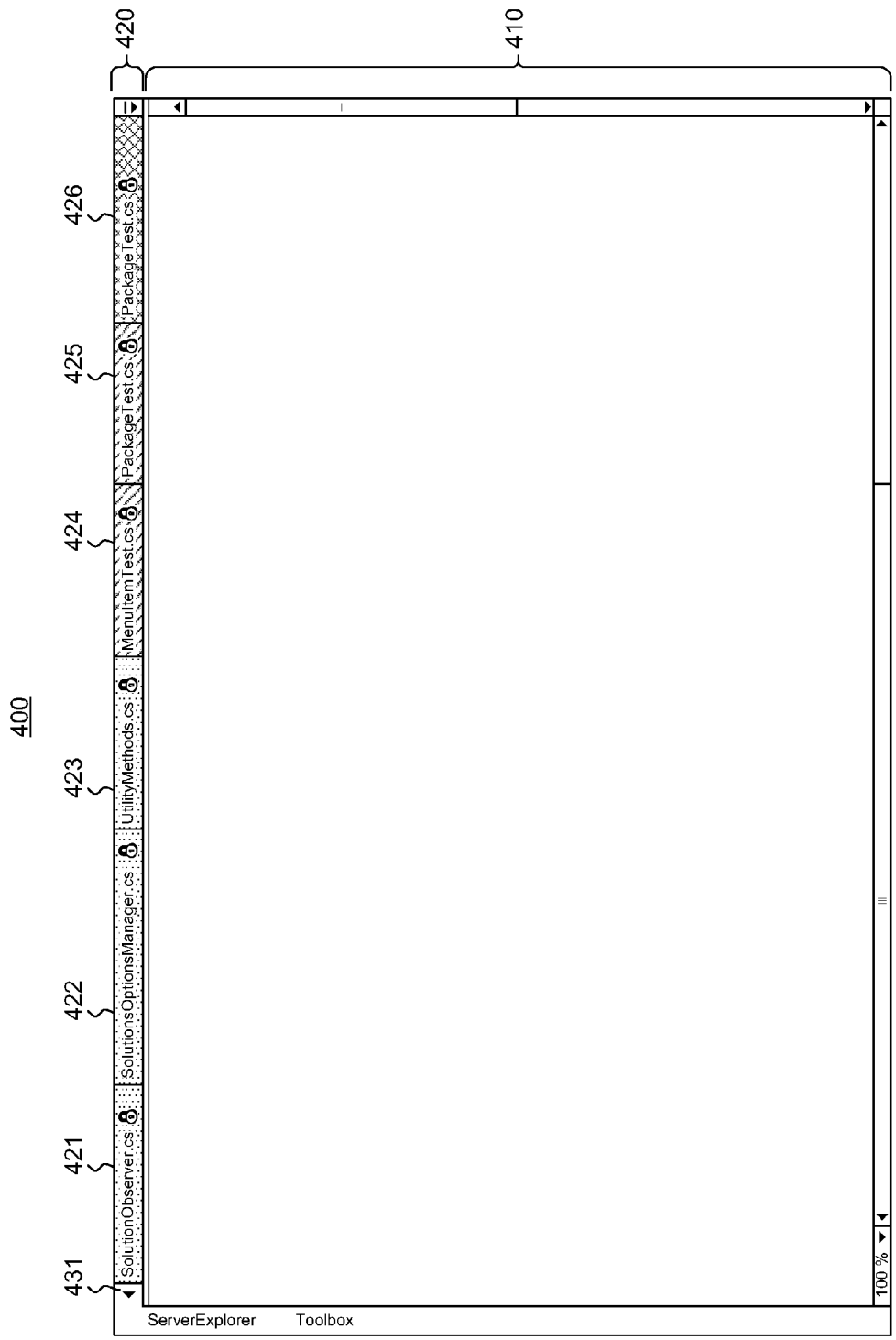
FIG. 4 illustrates an example multi-document interface in which there is a view area and multiple tabs, each corresponding to a document that may be displayed in the view area upon selection of the tab.

FIG. 4 illustrates an example user interface 400 that represents just one of an infinite variety of variations of the multi-document interface 210 of FIG. 2. The tab group element 420 is displayed along a row that is above the view area 410. In subsequent figures, the tab group element and view area will not be labeled to simplify the diagrams, although the tab group element appears above the view area in each of the subsequent figures that show a multi-document interface. In this case, six tabs 421 through 426 are visible corresponding to files SolutionObserver.cs, SolutionOptionsManager.cs, UtilityMethods.cs, MenuItemTest.cs, PackageTest.cs and PackageTest.cs. Any one of these documents may be displayed in the view area 410 by selecting the appropriate tab. There is a scroll indicator 431 (which is one example of a navigation control) that may be selected to scroll left in the list of tabs in the tab group element. Accordingly, in this case, although there are six tabs presently viewable, other tabs will be visualized by selecting the scroll indicator 431, whereupon those other tabs may be selected to display their corresponding documents. As one scrolls to the left, there will be tabs that become hidden on the right-hand side of the list, causing a right scroll indicator (not shown in FIG. 4) to appear.

Figure 5:
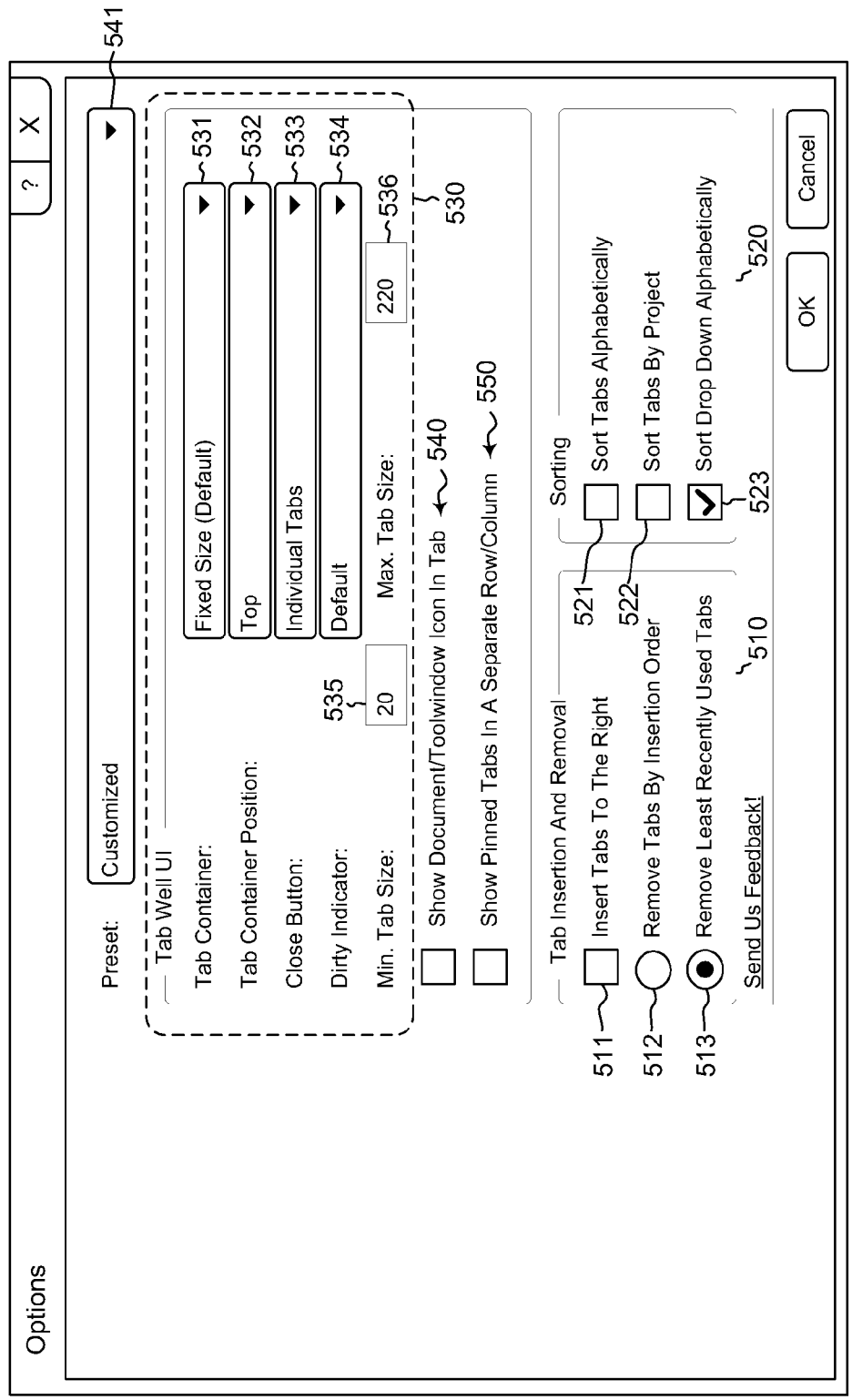
FIG. 5 illustrates an example configuration interface through which a user may configure the multi-document interface.

As previously mentioned, there are a number of items regarding the multi-document interface that may be configurable. Recall, therefore, that the multi-document application 200 of FIG. 2 includes a configuration interface 220. FIG. 5 represents an example of such a configuration interface 220.

FIG. 5 shows a configuration interface portion 500 in which a user may manipulate a tab insertion and removal criteria section 510 to edit an insertion and hiding criteria for deciding which tabs to hide when there are too many tabs to be viewed simultaneously in the tab group element and how to insert the tabs, a sorting criteria section 520 to edit a sorting criteria for deciding how the tabs are to be sorted in the tab group element, a tab sizing section 530 to allow a user to customize the sizing criteria for the tabs and other specialized features, a close control setting 533 for selecting where to place the close control for a tab, and a pinned tab section 550 that allows pinned tabs to be pinned in a separate row or column as compared to unpinned tabs.

The tab insertion and removal criteria section 510 includes an "Insert tabs to the right" radio button 511 that, when selected, inserts tabs to the right of the right-most previously existing tab. Otherwise, if not selected, new tabs are inserted to the left. Radio buttons 512 and 513 relate to removal or hiding of tabs when tab insertions result in too many tabs to be simultaneously viewable in the tab group element. Radio button 512, if selected, causes tabs to be removed by insertion order. In other words, if one of more tabs are to be hidden, then those tabs that are least recently added to the tab group element are selected for hiding. Radio button 513, if selected, causes tabs to be removed according to recency of use. For instance, if one or more tabs are to be hidden, then those tabs that are least recently used are selected for hiding.

Of course, the configuration interface 500 is just an example of the configuration interface 220 of FIG. 2. The principles described herein are not limited to any particular hiding criteria for hiding tabs when there is not enough room in the tab group element to display all tabs simultaneously. Any such hiding criteria may be configured by the user in accordance with the broader principles described herein. In each case, once a tab is hidden, an appropriate navigation control of the tab group element may permit navigation back to the tab to unhide the tab.

As an example, tabs may be hidden according to some document ranking of the corresponding document, where tabs of documents with the lowest ranking are hidden when new tabs require hiding of one or more other tabs.

Tabs may be hidden according to document edit time. The edit time may be the total edit time since the document was created, the total edit time since the tab was added to the tab group window, the total edit time within a particular period of time (e.g., two hours), the total edit time by the individual logged into the multi-document application (in cases in which the document has multiple authors), and so forth. However the edit time is measured, the tab corresponding to the document with the least edit time may be hidden.

Similarly, tabs may be hidden according to a document view time. The view time may be the total view time since the document was created, the total view time since the tab was added to the tab group window, the total view time within a particular period of time (e.g., two hours), the total view time by the individual logged into the multi-document application and so forth. However the view time is measured, the tab corresponding to the document with the least view time may be hidden.

Tabs may be hidden according to access frequency of the corresponding document, which may be the number of times that the document has been accessed in a given time period (e.g., since the document was created, last opened, or in a fixed time period, or a combination thereof), or the time between accesses, with a higher frequency of access representing smaller mean times between accesses. Those tabs corresponding to documents with lower frequency access may be first hidden when new tabs are added.

Tabs may be hidden according to a project identifier, with some projects receiving more protection against hiding, and some projects receiving less protection against hiding.

Tabs may also be hidden alphabetically, in which titles that have earlier alphabetical dictionary ordering being first (or last) to be hidden.

Tabs may also be hidden according to file type, with some file types having more protection against hiding, and some having less.

Hiding criteria may also take into consideration other parameters of the documents, and may include combinatorial logic applying multiple parameters of the document.

The sorting criteria section 520 includes sort tabs alphabetically check box 521 that, when selected, sorts the still visible tabs in alphabetical order. The sort tabs by project check box 522, when selected, sorts the tabs by project identifier. The sort drop down alphabetically button 523 sorts a drop down menu alphabetically, the drop down menu being used to select documents to open, to thereby cause a new tab to appear in the tab group element and potentially causing the document to open as well.

Once again, the sorting criteria section 520 is just an example of the types of sorting criteria that may be used to sort the tabs. The principles described herein are not limited to any particular tab sorting criteria. Any sorting criteria may be configured by the user in accordance with the broader principles described herein As an example, tabs may be sorted according to some document ranking of the corresponding document, which tabs being ordered according to the document ranking Tabs may be sorted according to document edit time. The edit time may be the total edit time since the document was created, the total edit time since the tab was added to the tab group window, the total edit time within a particular period of time (e.g., two hours), the total edit time by the individual logged into the multi-document application (in cases in which the document has multiple authors), and so forth.

Similarly, tabs may be sorted according to a document view time. The view time may be the total view time since the document was created, the total view time since the tab was added to the tab group window, the total view time within a particular period of time (e.g., two hours), the total view time by the individual logged into the multi-document application and so forth Tabs may be sorted according to access frequency of the corresponding document, which may be the number of times that the document has been accessed in a given time period (e.g., since the document was created, last opened, or in a fixed time period, or a combination thereof), or the time between accesses, with a higher frequency of access representing small mean times between accesses. Those tabs corresponding to documents with lower frequency access may be first hidden when new tabs are added.

Tabs may also be sorted according to insertion order of the tab, or in accordance with recency of usage.

Tabs may also be sorted according to file type.

Sorting criteria may also take into consideration other parameters of the documents, and may include combinatorial logic applying multiple parameters of the document.

The form and type of navigation control may also be configured by the user. As previously mentioned, when there are a certain number of documents opened in the multi-document application, there may be too many tabs to show in the tab group element. In that case, tab group elements hides one or more of the tabs, and shows only a subset of the available tabs in the tab group element. To allow navigation to the hidden tabs, the tab group element includes a navigation control.

In FIG. 4, for example, a left scroll control 431 is shown identifying a scroll navigation control in which the scroll causes tabs to be revealed one at a time and hidden one at a time as the user scrolls. However, the user might configure other types of navigation controls. For instance, the user might select a jump control in which the user jumps from one set of tabs to a different set of tabs. There might also be a sizing control in which navigation is achieved by making the tab sizes smaller (appearing as a zoom-out operation and allowing previously hidden tabs to a appear) in combination with making the tabs larger centering on a portion of interest (appearing as a zoom-in operation and focusing on a subset of the tabs at or near the center of the portion of interest).

Figure 6:
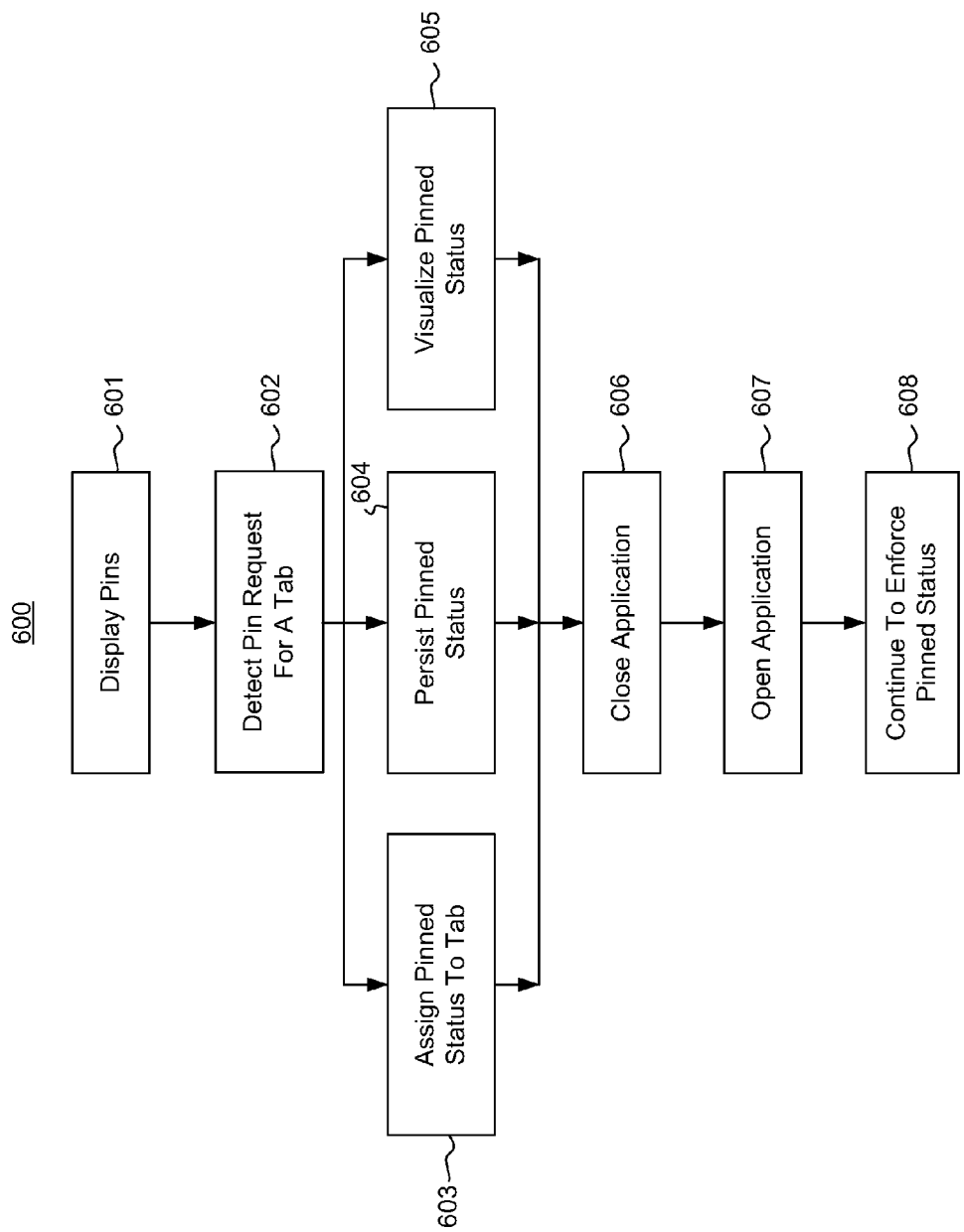
FIG. 6 illustrates a flowchart of a method for pinning tabs in a multi-document interface.

Another distinct point of customization in the multi-document interface is the use of pinned tabs. FIG. 6 illustrates a flowchart of a method 600 for pinning tabs described herein. Upon displaying a number of tabs (act 601), the multi-document interface detects a user selection to pin a selected tab (act 602). The multi-document interface provides a pin control that a user may activate to assign a pinned status to a selected tab. For instance, the user might right-click or perform some other gesture with respect to a tab to thereby request the tab be pinned.

In response to the request, the multi-document interface assigns a pinned status to the selected tab (act 603). The pinned gives the selected tab higher protection against being hidden when there are more tabs in the tab group element than are capable of being simultaneously displayed in the tab group element. In one embodiment, a pinned status guarantees that the corresponding tab assured protection against being hidden.

Figure 7:
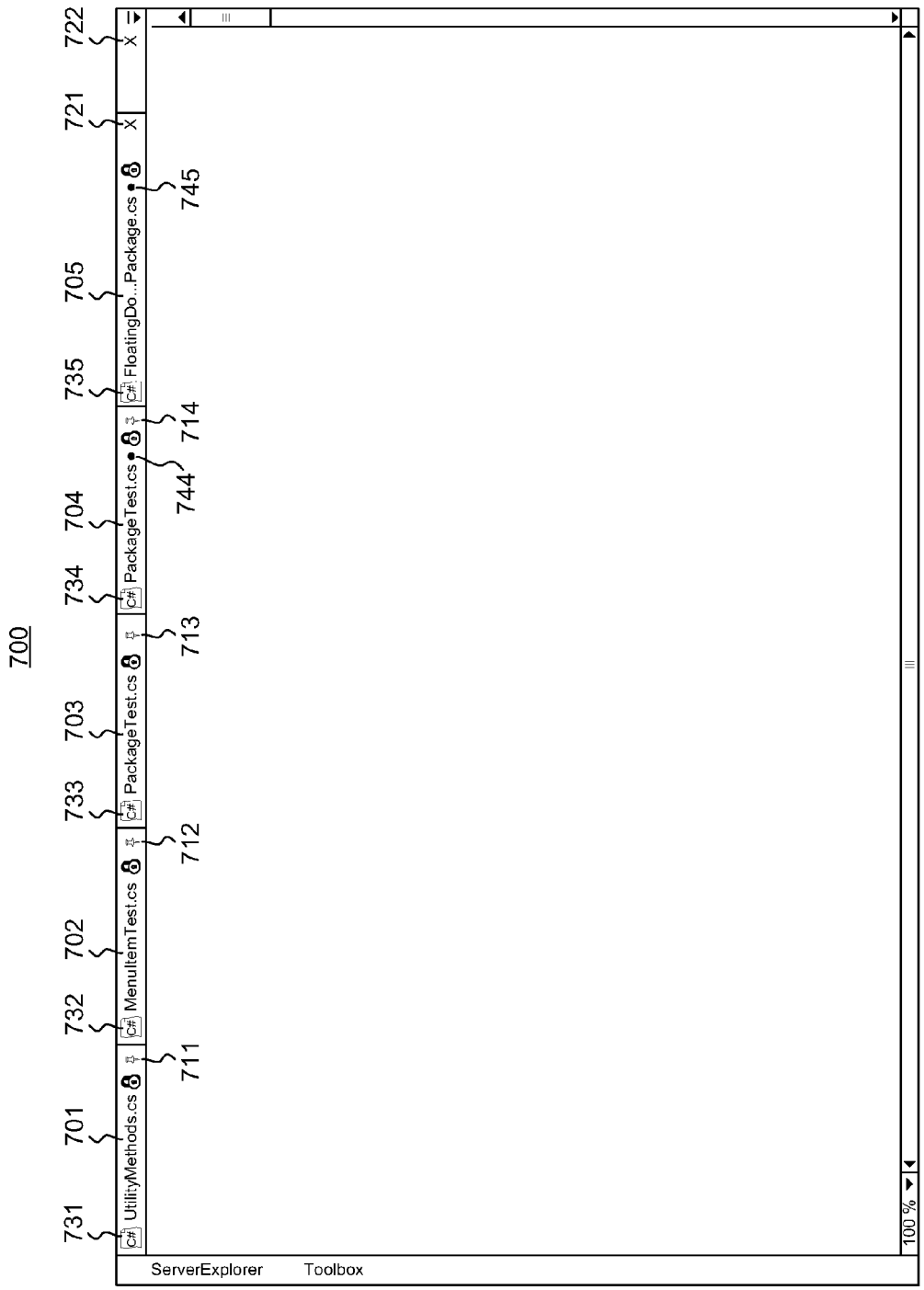
FIG. 7 illustrates a first example of pinned tabs in which the pinned tabs are in the same row as the unpinned tabs.
Figure 8:
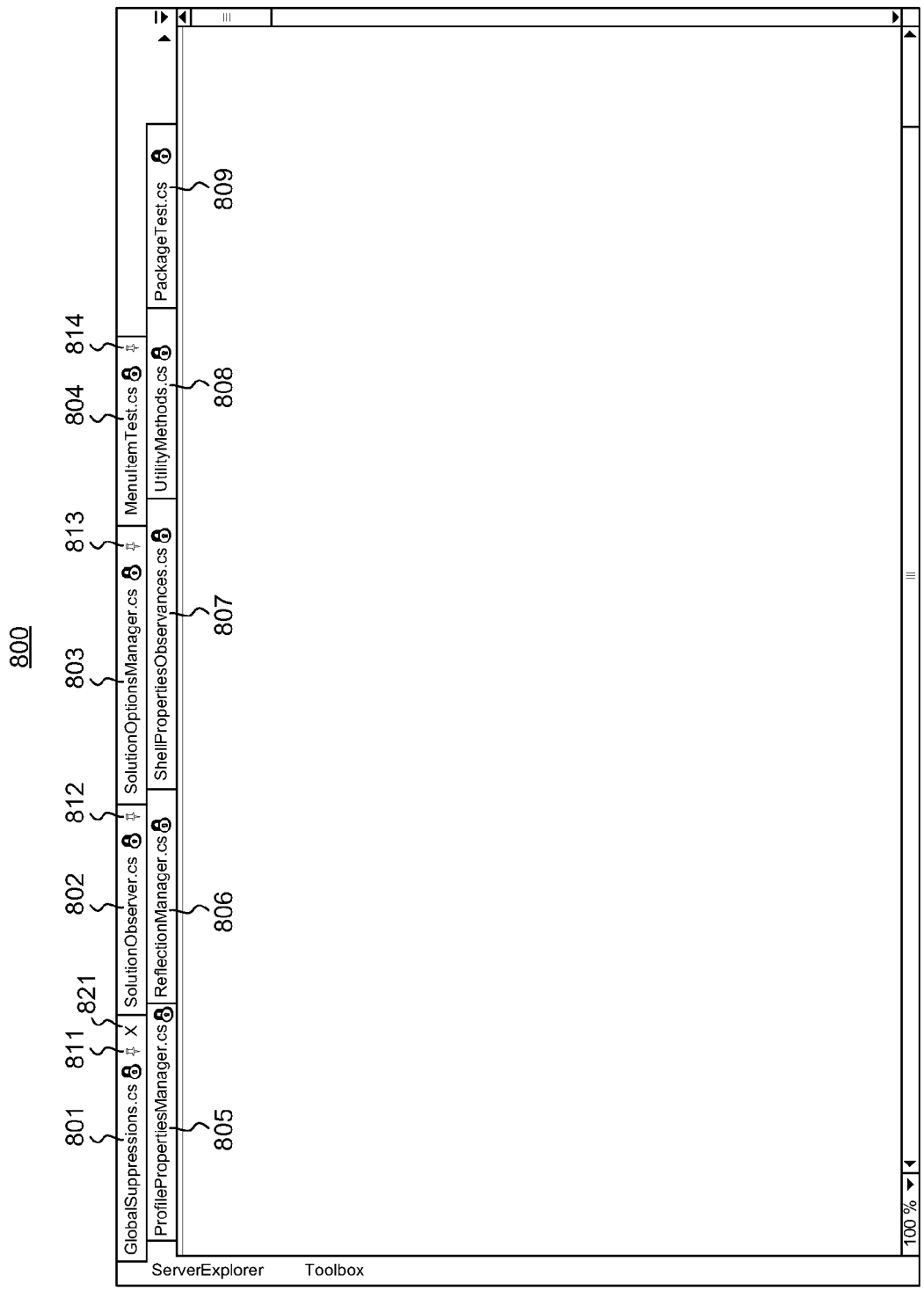
FIG. 8 illustrates a second example of pinned tabs in which the pinned tabs are in a separate row than the unpinned tabs.

Also, in response to the user requesting pinned status, the multi-document application persists the pinned status (act 604) such that the pinned status survives closing and reloading of the multi-document application. The tab also displays a visualization of the pinned status (act 605). FIGS. 7 and 8 illustrated two examples of how pinned status might be visualized.

In the interface 700 of FIG. 7, there are five tabs 701 through 705 corresponding to five documents. Since the right-most tab is highlighted, the corresponding document would normally appear in the view area, but is not displayed in FIG. 7 to simplify the drawing and avoid unnecessary distraction. The tabs 701 through 704 include a pin indicator 711 through 714, respectively, which represents a visual indicator that the corresponding tabs 701 through 704 are pinned. In this case, the multi-document interface protects such pinned tabs against being hidden should more tabs be added to the tab group element. In FIG. 7, the pinned tabs are displayed in a separate area of the tab group element as compared to the unpinned tabs. In this specific case, that specific area is to the left of all unpinned tabs.

In FIG. 7, in which the pinned tabs are aligned in the same row as the unpinned tabs, a separator visualization may appear between the pinned tabs section and the unpinned tabs separator. This separator indicates the boundary between pinned and unpinned tabs, giving the user a further intuitive understanding of which tabs are pinned and unpinned.

In another example, in the interface 800 of FIG. 8, there are nine pins 801 through 809 corresponding to nine documents. Since the pin 801 is highlighted, the corresponding document would normally appear in the view area, but is not displayed in FIG. 8. The tabs 801 through 804 include a pin indicator 811 through 814, respectively, again representing a visual indicator that the corresponding tabs 801 through 804 are pinned. As more tabs are added, the tabs 801 and 804 are protected against being hidden. In FIG. 8, the pinned tabs are displayed in a separate area of the tab group element as compared to the unpinned tabs. In this specific case, that specific area above all unpinned tabs.

More generally speaking, the tab group element aligns unpinned elements in a first direction (horizontally in FIG. 8). The pinned element section is also aligned in the first direction (horizontally in FIG. 8), but is stacked on the unpinned elements in a second direction (vertically in FIG. 8). "Stacked" in the vertical sense means that the unpinned section is either above or below the pinned section. "Stacked" in the horizontal sense (in which case the unpinned tabs are in a column, and the pinned tabs are in a separate column), the pinned tab column may be to the right or to the left of the unpinned tab column.

As new unpinned tabs are added to the unpinned tabs area, a navigation control may appear associated with the unpinned tab section, allowing navigation through the unpinned tabs. However, the pinned tabs are not hidden, and therefore no navigation control is needed for the pinned tab area.

Referring to FIG. 5, the user may configure how to display pinned tabs using the check box 550. If the check box 550 is selected, the pinned tabs will be displayed in a separate row (in the case of FIG. 8) when the tabs are displayed in a horizontal row, or in a separate column if the tabs are displayed in a column. If the check box is not selected, the pinned tabs will be displayed in the same row (as in the case of FIG. 7) or in the same column if the tabs are organized vertically in a column.

In the embodiments shown in FIGS. 7 and 8, when a tab is pinned, the tab does not display less information regarding the corresponding document as compared to before the tab was pinned. When a tab is created, the tab is annotated with enough information for the user to be able to identify the corresponding document that will be displayed in the view area if the user selects the tab. For example, that information may include all or a portion of the title of the document. When the tab is pinned, the information remains in the tab. This is useful as it allows for pinning of tabs without losing identifying information regarding the underlying document.

Referring back to FIG. 6, recall that the pinned status of the tabs is persisted. Accordingly, upon closing the application (act 606), and reopening the application (act 607), the pinned status of the pin remains in force (act 608).

Figure 9:
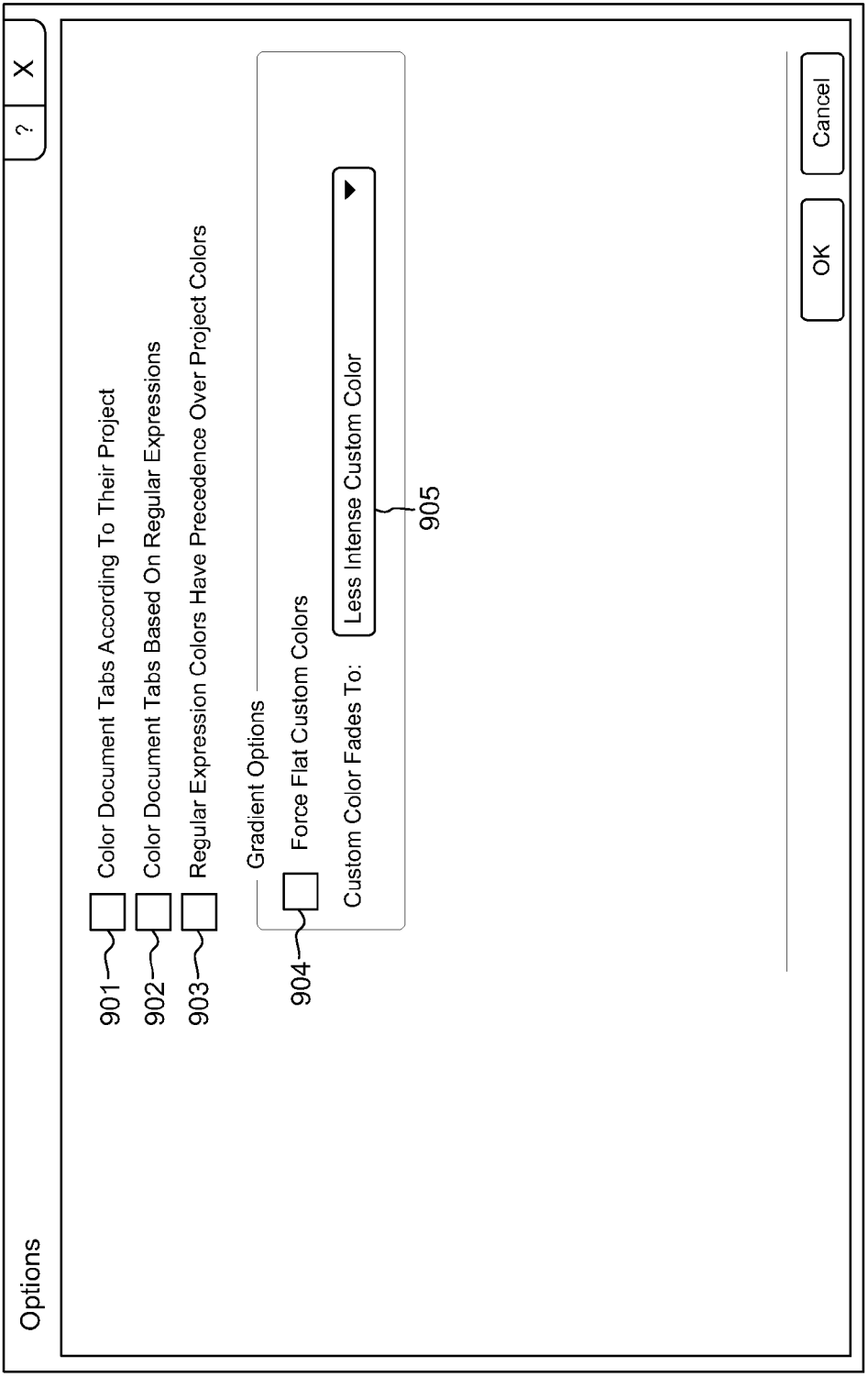
FIG. 9 illustrates a coloring configuration interface that may be used to color tabs in a customized way.

The user may also configure a number of coloring criteria of the multi-document interface. For instance, FIG. 9 illustrates a coloring configuration interface 900 that includes five configuration settings 901 through 905.

Figure 10:
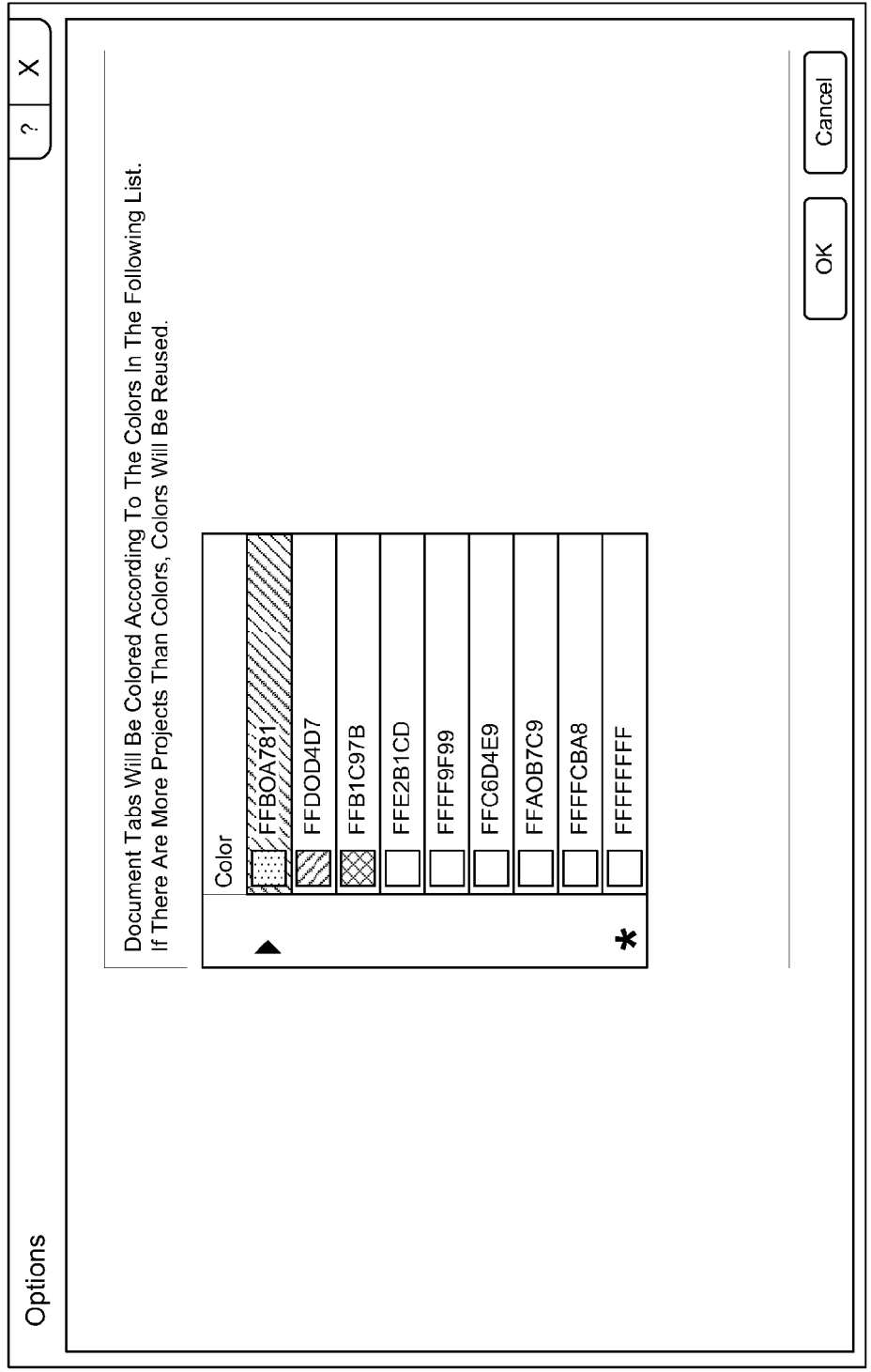
FIG. 10 illustrates a user interface in which the colors available to correspond to projects may be customized by the user, or at least displayed to the user.

Configuration setting 901 is a check box control that, when selected, colors the tabs by the project identifier of the underlying document. In the user interface 400 of FIG. 4, different colors (in black and white representations, different colors are represented by different hash marking or shades of grey in the tabs henceforth) represent different projects. Here, tabs 421 through 423 correspond to documents of one particular project, as represented by the tabs having the same color. Tabs 424 and 425 correspond to documents of another particular project, as represented by those tabs have the same color as each other, which project is a different project than that of tabs 421 through 423, as represented by the fact that tabs 424 and 425 have a different color than tabs 421 through 423. Finally, tab 426 has yet another different color, representing that the tab corresponds to a project that is different than that of the documents represented by the other tabs 421 through 425. FIG. 10 illustrates a user interface 1000 in which the colors available to correspond to projects may be customized by the user, or at least displayed to the user.

Figure 11:
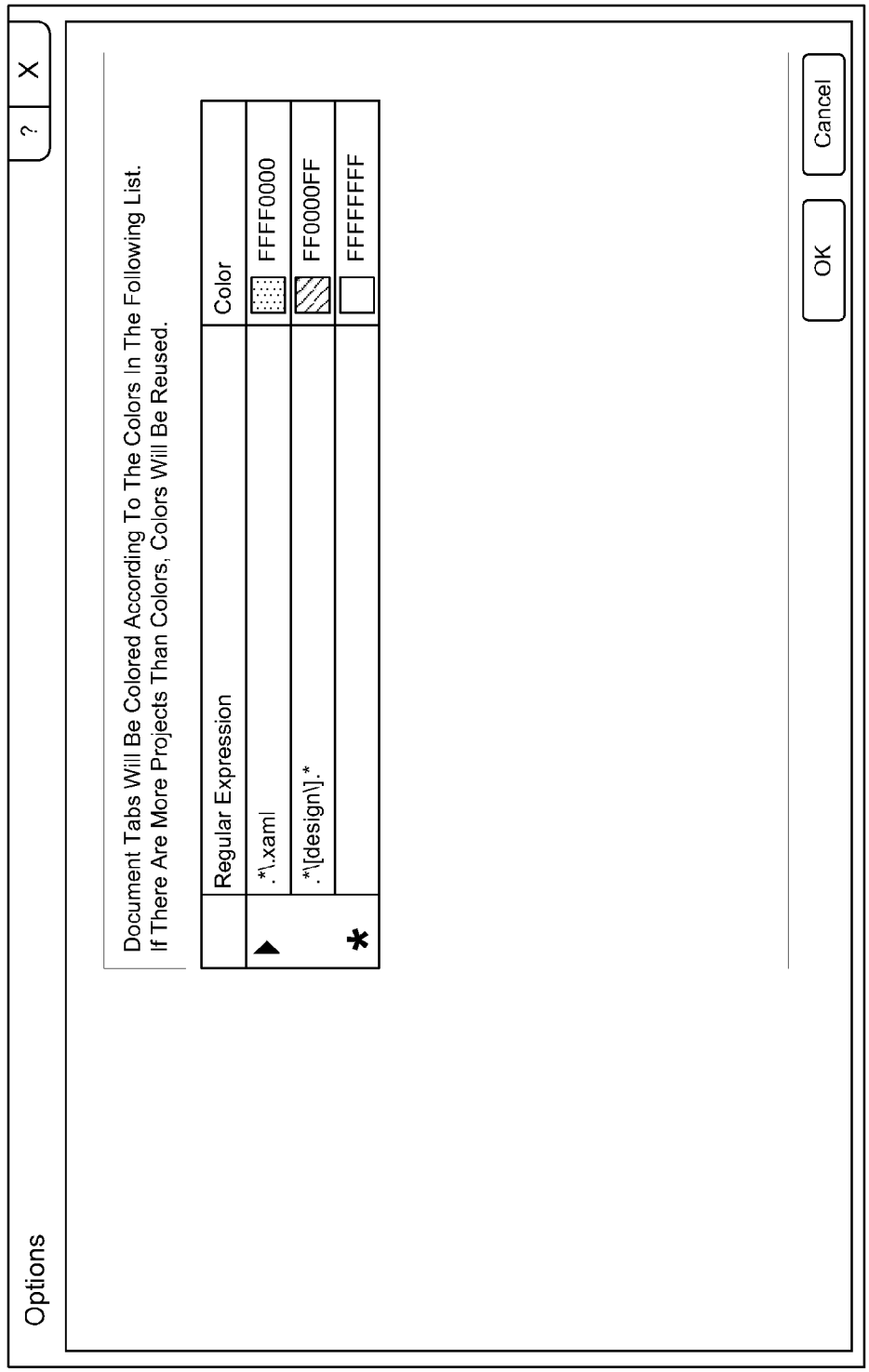
FIG. 11 illustrates a user interface in which a user may set expressions that are evaluated to color the tabs.

Referring back to FIG. 9, tabs may also be configured by file type of the corresponding document. This type of color coding, and more complex configurations for color coding, may be accomplished by allowing the user to configure colorization by applying an expression to all of or part of the file path and/or file name of the corresponding documents. The selection of check box 902 in FIG. 9 enables this functionality. Upon selecting check box 902, the user interface 1100 of FIG. 11 may appear. In the example of FIG. 11, the user has selected two expressions to apply to the tabs. In the first expression, as applied, any tab representing a XAML document will be colored with color FFFF0000. In the second expression, as applied, any tab that includes the phrase "[design]" in the title will have their tab colored with color FF0000FF.

Figure 12:
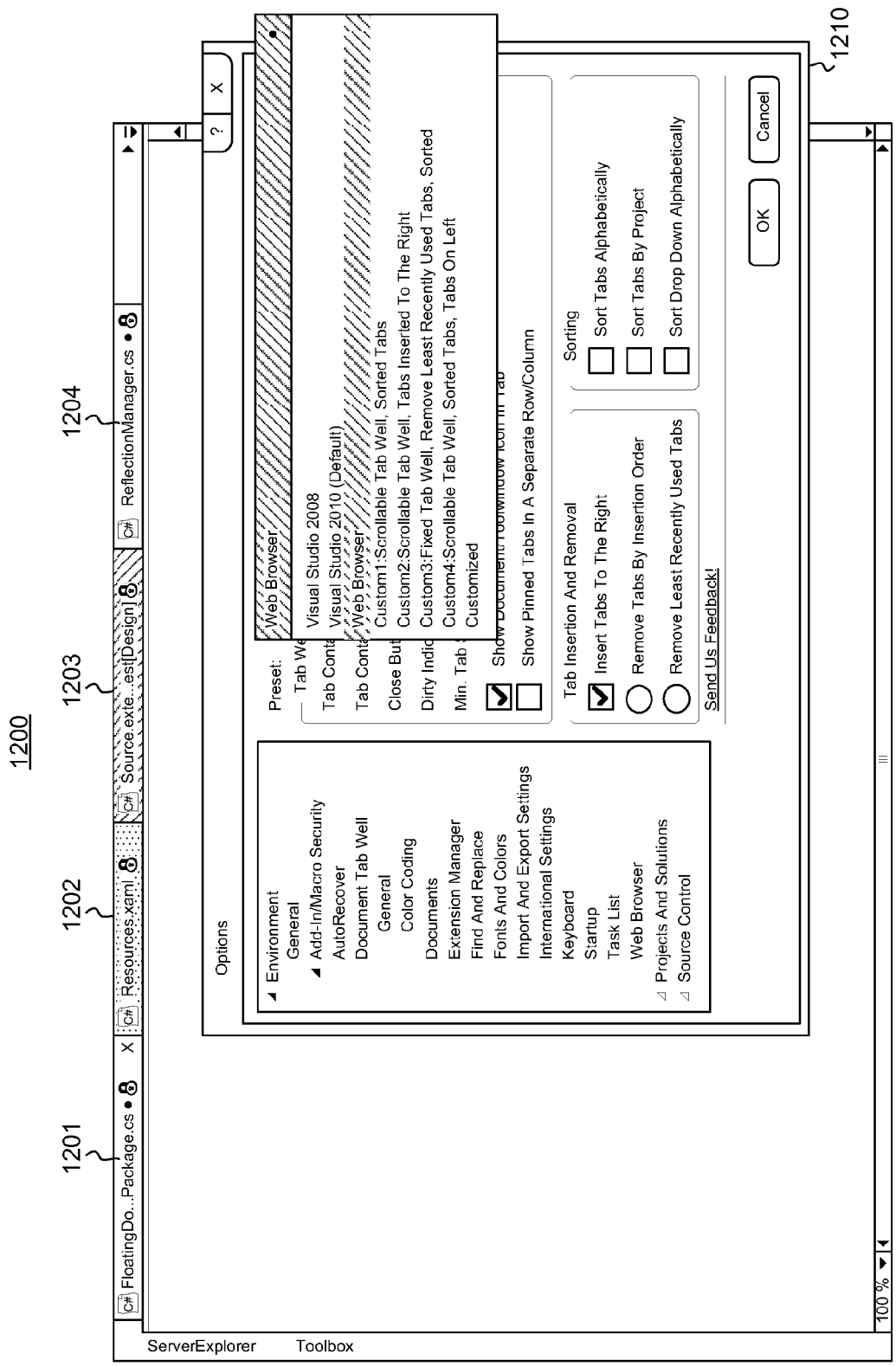
FIG. 12 illustrates a multi-document interface in which the tabs have been colored according to the expressions of FIG. 11.

FIG. 12 illustrates the resulting application of color to a user interface 1200 after applying the expressions (ignoring the window 1210 for the moment, which is included for later discussion of configuration presets). Here, the tab group element 1200 includes tabs 1201 through 1204. Tab 1201 corresponds to the actively viewed document and is thus a light color. Tab 1202 does indeed correspond to a XAML document, and so receives the colorization assigned by the first expression in FIG. 11. Tab 1203 does indeed correspond to a document that includes the term "[design]" in the title, and thus will receive the colorization assigned by the second expression in FIG. 11. Tab 1204 has a corresponding document that does not match any of the expressions of FIG. 11, and thus receives a default colorization appropriate for a document that is not being actively viewed in the view area.

Referring back to FIG. 9, both the check boxes 901 and 902 may be activated at the same time, in which case check box 903 may be used to allow the user to resolve the ambiguity as to whether regular expression colors should receive priority over project colors. If priority is given to regular expressions, and a tab corresponds to a document that satisfies a colorization expression, the color of the tab will be decided by the colorization expression, regardless of the project of that document. If priority is given to the project colorization, the color of the tab will be decided by the project of the document if the document corresponds to a project, regardless of whether the document satisfies an expression.

Check box 904 forces the tab colors to be flat, having no intensity gradient. Drop down menu 905 is actively available when the check box 904 is not selected, and allows the user to select different gradients to apply to the tabs for more customized colorization of the tab.

Color coding may also be applied to the tabs according to any other one or more attributes of the tab. For instance, the color may apply according to the size of the document, the recency of usage of the corresponding document, or any other attribute previously described as potentially having an impact on which tabs are hidden, or the sorting order of the tabs.

Other items may be configured by the user. Referring to FIG. 5, a drop down menu 531 is provided in order to allow the user to customize the size of the tab group element.

Drop down menu 532 is provided in order to allow the user to position the tab group element horizontally along the top or bottom of the view area in which the active document is displayed, or vertically along the left or right of the view area.

Drop down menu 533 is provided to allow a user to select which close controls should be present in the tab group element. For example, in one case, the user might select to have no close controls available in the tab group element. In that case, the user might rely on other close controls to control the currently active document. In another case, the user might select to have the close control appear only in the tab corresponding to the active document. In that case, the user might close the active document by closing the close control in the active tab. For example, in FIG. 8, the tab 801 is the active tab, and thus the tab 801 is the only tab with a close control 821. In another case, the user might select to have the close control appear outside of any tab, but still associated with the tab group element. Referring to FIG. 7, the close control 722 may be used to close the active document. In another case, the user might select to have both that close control 722, and a close control selectable from inside the active tab. In FIG. 7, for example, not only is there a close control 722 that is not attached to any particular tab, but there is also an independent close control 721 associated with the active tab 705. Thus, either may be used to close the document associated with the active tab 701.

The presence or absence of a file type icon indicator within the tab may also be configurable by the user by selecting radio button 540. For instance, in FIG. 7, file type indicators 731 through 735 appear in respective tabs 701 through 705 giving the user a visual indication of the file type of the available documents.

The type of "dirty indicator" may also be configurable by the user using drop down menu 534. For instance, in FIG. 7, tabs 704 and 705 include respective dirty indicators 744 and 745. In this case, the dirty indicator is a red circle, but the drop down menu 534 could be used to select other preferences. The dirty indicator might identify documents who have had edits that have not yet been persisted.

The tab size of the tabs may also be configurable by the user. The min. tab size box 535 is used to select the minimum tab size, and the max. tab size box 536 is used to select the maximum tab size. Thus, even if the identifying information that appears in the tab is much smaller than the minimum pixels size (20 pixels in the case of FIG. 5), the tab will default to the minimum pixel size. Also, if the identifying information that is to appear in the tab is larger than the maximum size (220 pixels in the case of FIG. 5), the tab will default to the maximum pixel size, resulting in some truncation of the identifying information.

Thus, what has been described is a multi-document interface that is highly configurable by the user, with many possible configuration settings. To help manage the configuration settings, the multi-document application also includes a configuration preset interface that allows a user to select a preset option that automatically sets a plurality of the customization settings offered by the configuration interface. Referring to FIG. 12, the window 1210 is an example of such a preset interface. When the user selects a particular preset, a number of underlying configuration settings are altered.

In one example, a preset option causes the multi-document interface to emulate a prior version of the multi-document application.

In another example, there may be a preset option that restores default settings of the current version of the multi-document application.

There may also be other custom settings that are provided fixed within the multi-document application (e.g., Custom 1, Custom 2, Custom 3, and Custom 4 in the window 1210). The user might also customize the settings. For instance, in FIG. 5, the preset setting 541 is "Customized" allowing the user to edit the configuration settings. The drop down menu 541 might also be used to select any of the other presets, thereby allowing the user to at least see the configuration settings for those other presets.

Accordingly, a multi-document application is described that allows for a high degree of user configurability, with strong management tools to manage the configuration of the multi-document interface.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for pinning a tab in a tab group element of a multi-document application, the method comprising:
   an act of providing a multi-document interface, the multiple document interface comprising:
      a view area configured to display one document at a time, even if multiple documents are opened in the multi-document application; and
      a tab group element configured to display a plurality of tabs, each tab comprising a control that permits a corresponding document to be visualized in the view area, wherein if there are too many tabs to be displayed simultaneously in the tab group element, the multi-document interface displays a subset of the plurality of tabs along with a navigation control for navigating through the plurality of tabs to change which subset is displayed in the tab group element;
   an act of detecting a user selection to pin a selected tab of the plurality of tab groups;
   an act of assigning a pin status to the selected tab in response to the act of detecting, wherein the pin status gives the selected tab higher protection against being hidden when there are more tabs in the tab group element than are capable of being simultaneously displayed in the tab group element;

in response to the act of detecting, an act of persisting the pin status of the selected tab in a manner that the pin status survives closing and reloading of the multi-document application;

providing a configuration interface control which is user selectable for selecting a display setting for controlling whether the selected tab will be positioned in a same row within the tab group element with one or more other tabs that have an unassigned pin status or, alternatively, whether the selected tab will be placed in a different row than the one or more other tabs having the unassigned pin status; and displaying the selected tab in either the same row or the different row according to the display setting.

2. The method in accordance with claim 1, further comprising:

in response to the act of detecting, an act of displaying a visualization associated with the selected tab to distinguished the selected tab from one or more other tabs that are not pinned, the visualization comprising an icon that is added to the tab and that is displayed along with other content that was displayed within the tab prior to the selected tab becoming pinned.

3. The method in accordance with claim 1, wherein the pin status gives the selected tab assured protection against being hidden when there are more tabs in the tab group element than are capable of being simultaneously displayed in the tab group element.

4. The method in accordance with claim 1, further comprising:

in response to the act of detecting, an act of displaying the pinned tab in a separate area of the tab group element as compared to unpinned tabs.

5. The method in accordance with claim 4, wherein the tab group element aligns unpinned elements in a first direction, wherein the separate area of the tab group element is also aligned with the unpinned elements, but with a separator visualization indicating a separation between the unpinned tabs and the pinned tab.

6. The method in accordance with claim 4, wherein the separate area of the tab group element does not include a navigation control that changes which pinned tabs are displayed, whereas an area of the tab group element for unpinned tabs does include a navigation control that changes which unpinned tabs are displayed.

7. The method in accordance with claim 1, wherein the tab group element includes at least one row for unpinned tabs, and at least one row for unpinned tabs such that the at least one row for unpinned tabs is placed above or below the at least one row for unpinned tabs in the tab group element.

8. The method in accordance with claim 1, wherein when a tab is pinned, the tab continues to display document identification information within the tab that was displayed before the tab was pinned.

9. A computer program product comprising one or more computer-readable storage devices having computer-executable instructions that, when executed by one or more processors of a computing system, cause the computing system to visualize a multi-document interface in a multi-document application, the multi-document interface comprising:

a view area configured to display one document at a time, even if multiple documents are opened in the multi-document application;

a tab group element configured to display a plurality of tabs, each tab comprising a control that permits a corresponding document to be visualized in the view area, wherein if there are too many tabs to be displayed simultaneously in the tab group element, the multi-document interface displays a subset of the plurality of tabs along with a navigation control for navigating through the plurality of tabs to change which subset is displayed in the tab group element wherein the multi-document interface provides a pin control that a user may activate to assign a pinned status to a selected tab of the plurality of tabs in the tab group element, wherein the pin status gives the selected tab higher protection against being hidden when there are more tabs in the tab group element than are capable of being simultaneously displayed in the tab group element; and a configuration interface control which is user selectable for selecting a display setting for controlling whether the selected tab will be positioned in a same row within the tab group element with one or more other tabs that have an unassigned pin status or, alternatively, whether the selected tab will be placed in a different row than the one or more other tabs having the unassigned pin status.

10. The computer program product in accordance with claim 9, wherein the pin status of the selected tab is persisted in a manner that the pin status survives closing and reloading of the multi-document application.

11. The computer program product in accordance with claim 9, wherein for at least some documents that are opened by the multi-document interface, when a new document is opened in the multi-document application, the multi-document interface adds a new tab to the plurality of tabs to represent the newly opened document.

12. The computer program product in accordance with claim 9, wherein the tab having the pinned status includes a visualization indicative of the pinned status comprising an icon that is added to the tab with the document identification information.

13. The computer program product in accordance with claim 9, wherein pinned tabs are displayed in a pinned tab row of the tab group element, and unpinned tabs are displayed in an unpinned tab row of the tab group element.

14. The computer program product m accordance with claim 13, wherein the unpinned tab row includes a navigation control for selecting a subset of the unpinned tabs that is displayed in the unpinned tab row.

15. The computer program product in accordance with claim 14, wherein all pinned tabs of the plurality of tabs of the tab group element are displayed in the pinned tab portion.

16. The computer program product in accordance with claim 9, wherein the pinned status gives the pinned tab assured protection against being hidden when there are more tabs in the tab group element than are capable of being simultaneously displayed in the tab group element.

17. The computer program product of claim 9, wherein when a tab is pinned, the tab continues to display document identification information within the tab that was displayed before the tab was pinned.

18. A computing system comprising:

at least one processor: and one or more computer-readable storage device having stored computer-executable instructions that, when executed by the one or more processors, cause the computing system to visualize a multi-document interface in a multi-document application, the multi-document interface comprising:

a view area configured to display one document at a time, even if multiple documents are opened in the multi-document application;

a tab group element configured to display a plurality of tabs, each tab comprising a control that permits a corresponding document to be visualized in the view area, wherein for at least some documents that are opened by the multi-document interface, when a new document is opened in the multi-document application, the multi-document interface adds a new tab to the plurality of tabs to represent the newly opened document, wherein if there are too many tabs to be displayed simultaneously in the tab group element, the multi-document interface displays a subset of the plurality of tabs along with a navigation control for navigating through the plurality of tabs to change which subset is displayed in the tab group element wherein the multi-document interface provides a pin control that a user may activate to assign a pinned status to a selected tab of the plurality of tabs in the tab group element, wherein the pin status gives the selected tab higher protection against being hidden when there are more tabs in the tab group element than are capable of being simultaneously displayed in the tab group element, wherein the pinned status of the selected tab is persisted in a manner that the pin status survives closing and reloading of the multi-document application; and a configuration interface control which is user selectable for selecting a display setting for controlling whether the selected tab will be positioned in a same row within the tab group element with one or more other tabs that have an unassigned pin status or, alternatively, whether the selected tab will be placed in a different row than the one or more other tabs having the unassigned pin status.

19. The system of claim 18, wherein pinned tabs are displayed in a first row of the tab group element, and unpinned tabs are displayed in a second row of the tab group element.

\* \* \* \* \*